United States Patent
Gattegno

(10) Patent No.: US 8,874,891 B2
(45) Date of Patent: Oct. 28, 2014

(54) SYSTEMS AND METHODS FOR ACTIVATION OF APPLICATIONS USING CLIENT-SPECIFIC DATA

(75) Inventor: Yves Gattegno, L'Hay le Roses (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 23 days.

(21) Appl. No.: 13/639,501

(22) PCT Filed: May 20, 2010

(86) PCT No.: PCT/IB2010/001638
§ 371 (c)(1),
(2), (4) Date: Oct. 4, 2012

(87) PCT Pub. No.: WO2011/144961
PCT Pub. Date: Nov. 24, 2011

(65) Prior Publication Data
US 2013/0024681 A1    Jan. 24, 2013

(51) Int. Cl.
*G06F 9/00* (2006.01)
*G06F 21/12* (2013.01)
*G06F 9/445* (2006.01)
*G06F 9/44* (2006.01)

(52) U.S. Cl.
CPC ............... *G06F 21/121* (2013.01); *G06F 8/63* (2013.01); *G06F 9/4416* (2013.01)
USPC ............... 713/2; 713/193; 713/189; 713/100; 726/3; 726/5; 711/118

(58) Field of Classification Search
CPC .. G06F 21/53; H04L 12/2461; H04L 63/0876
USPC ...... 713/2, 100, 193, 182; 726/2, 3; 380/270; 715/760
See application file for complete search history.

(56) References Cited

U.S. PATENT DOCUMENTS

| | | | |
|---|---|---|---|
| 6,243,468 B1 | 6/2001 | Pearce et al. | |
| 7,281,124 B2 * | 10/2007 | Rothman et al. | 713/1 |
| 7,865,579 B2 | 1/2011 | Birse et al. | |
| 8,131,987 B2 * | 3/2012 | Lo et al. | 713/2 |
| 8,381,264 B1 * | 2/2013 | Corddry et al. | 726/3 |
| 8,386,798 B2 * | 2/2013 | Dodgson et al. | 713/189 |
| 8,413,142 B2 * | 4/2013 | Sharp et al. | 718/1 |
| 8,468,591 B2 * | 6/2013 | Silverstone | 726/16 |
| 8,510,861 B2 * | 8/2013 | Eriksson et al. | 726/32 |
| 2002/0184161 A1 | 12/2002 | Chang | |
| 2005/0289072 A1 | 12/2005 | Sabharwal | |

(Continued)

OTHER PUBLICATIONS

Krsul I, VMPLants: Providing and Managing Virtual Machine Execution Environments, Nov. 2004, vol. 11, pp. 6-12.*

(Continued)

*Primary Examiner* — Dede Zecher
*Assistant Examiner* — Viral Lakhia
(74) *Attorney, Agent, or Firm* — Scott A. Pojunas

(57) ABSTRACT

Example embodiments relate to activation of an application included on a shared virtual disk using client-specific data. In particular, example embodiments retrieve, from a client-specific location on a virtual disk server, activation credentials generated in response to successful activation of the application during a previous boot Example embodiments then reinstall the application activation credentials to verify activation of the application for the particular client computing device.

10 Claims, 9 Drawing Sheets

(56) References Cited

U.S. PATENT DOCUMENTS

| | | | |
|---|---|---|---|
| 2007/0233727 A1* | 10/2007 | Guy et al. | 707/102 |
| 2008/0103977 A1 | 5/2008 | Khosravy et al. | |
| 2008/0243683 A1 | 10/2008 | Patel et al. | |
| 2008/0244754 A1 | 10/2008 | Curren | |
| 2009/0204964 A1* | 8/2009 | Foley et al. | 718/1 |
| 2009/0222926 A1 | 9/2009 | Pavan et al. | |
| 2009/0327091 A1* | 12/2009 | Hartin et al. | 705/26 |
| 2009/0328225 A1 | 12/2009 | Chambers et al. | |
| 2010/0153697 A1* | 6/2010 | Ford et al. | 713/2 |
| 2010/0162003 A1* | 6/2010 | Dodgson et al. | 713/193 |
| 2011/0007901 A1* | 1/2011 | Ikeda et al. | 380/270 |
| 2011/0083006 A1* | 4/2011 | Maruyama et al. | 713/2 |
| 2011/0185355 A1* | 7/2011 | Chawla et al. | 718/1 |
| 2011/0246719 A1* | 10/2011 | Knox et al. | 711/118 |

OTHER PUBLICATIONS

Anonymous, "Disk Image," Wikipedia, the free encyclopedia, Apr. 22, 2010, pp. 1-4, Available at: <http://en.wikipedia.org/wiki/index/php?title=Disk_image&oldid=357533788>.

Anonymous, "Diskless Remote Boot in Linux," Wikipedia, the free encyclopedia, Dec. 16, 2009, pp. 1-3, Available at <en.wikipedia.org/wiki/index/php?title=Diskless_Remote_Boot_in_Linux&oldid=332048216>.

Anonymous, "Product Key," Wikipedia, the free encyclopedia, May 4, 2010, pp. 1-3, Available at: <en.wikipedia.org/wiki/index/php?title=Product_key&oldid=360073750>.

International Search Report and Written Opinion, International Application No. PCT/IB2010/001638, Date of Mailing Nov. 10, 2010, pp. 1-12.

* cited by examiner

SYSTEMS AND METHODS FOR ACTIVATION OF APPLICATIONS USING CLIENT-SPECIFIC DATA

BACKGROUND

Original equipment manufacturers have recently developed network computing solutions designed for simplified implementation and maintenance. In particular, hardware manufacturers and software editors have developed servers that transmit a single shared image to multiple clients. The shared image may include, for example, an operating system and any other applications deemed necessary by the IT staff. Upon connecting to the network, each client may stream the shared image, load the operating system, and execute any installed applications.

In these configurations, because all clients access the same shared image, the IT staff may easily maintain the entire network by making necessary changes to the shared image. Furthermore, in some configurations, each client may be a "thin client" that only includes enough hardware to present a user interface, since all required software is hosted on the server and all storage is provided by the server. However, in these configurations, problems may arise with the application activation process.

BRIEF DESCRIPTION OF THE DRAWINGS

In the accompanying drawings, like numerals refer to like components or blocks. The following detailed description references the drawings, wherein.

DETAILED DESCRIPTION

Although the use of a shared virtual disk reduces the time expended on maintenance and minimize hardware costs, additional issues may arise due to the sharing of a single disk image. For example, some operating systems and other applications include an activation process that ensures that each computer is authorized to run the application and that the installed version is a genuine copy. Such an activation process may use unique characteristics of each client to differentiate between them. Thus, in shared disk environments, the activation process may be triggered on each client, but may experience problems, as the shared image may be activated for a computer with differing characteristics. In such instances, the inability to correctly activate the operating system or other application for a particular client may require additional user interaction to address the issue or even render the application unusable.

As described below, example embodiments address this issue by allowing for activation of the application using client-specific data maintained on a virtual disk server. In particular, in some embodiments, during a first boot of a shared virtual disk, the client computing device retrieves activation credentials for activating an application from a client-specific location on the virtual disk server. The activation credentials may then be reinstalled to verify activation of the application for the particular client. In this manner, applications installed on the shared virtual disk, such as the operating system, may be effectively activated for each client computing device, even when multiple client computing devices share the same virtual disk. Additional embodiments and applications of such embodiments will be apparent to those of skill in the art upon reading and understanding the following description.

In the description that follows, reference is made to the the "machine-readable storage medium." As used herein, the term "machine-readable storage medium" refers to any electronic, magnetic, optical, or other physical storage device that contains or stores executable instructions or other data (e.g., a hard disk drive, flash memory, etc.).

Figure 1:
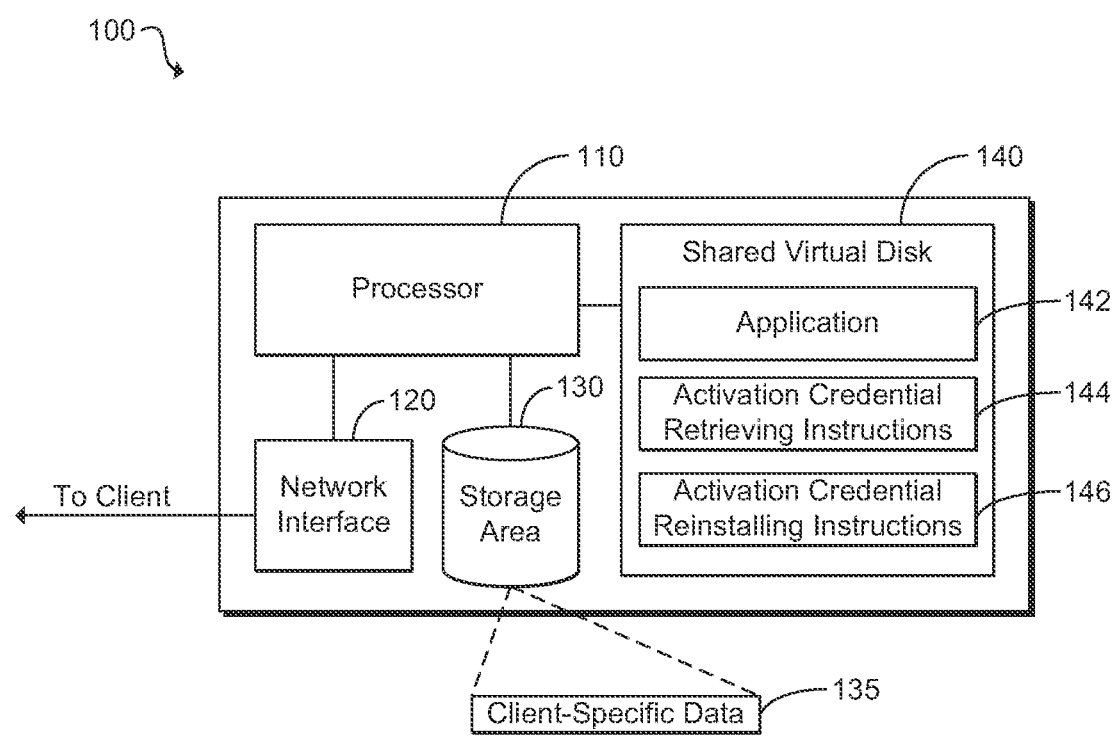
FIG. 1 is a block diagram of an example server for providing access to an application to a plurality of clients via a shared virtual disk, the shared virtual disk including instructions for activating the application.

Referring now to the drawings, FIG. 1 is a block diagram of an example server 100 for providing access to an application 142 to a plurality of clients via a shared virtual disk 140, the shared virtual disk 140 including instructions 144, 146 for activating the application 142. Server 100 may be, for example, an enterprise server of a local area network, a thin client server, a cloud computing server, or the like. In the embodiment of FIG. 1, server 100 includes processor 110, network interface 120, storage device 130, and shared virtual disk 140.

Processor 110 may be a central processing unit (CPU), a semiconductor-based microprocessor, or any other hardware device suitable for retrieval and execution of instructions stored in a machine-readable storage medium of server 100. In particular, processor 110 may manage the process of accessing and transmitting shared virtual disk 140 to a number of clients.

Network interface 120 may be a hardware device that manages the transmission and receipt of data to and from a plurality of clients. Thus, network interface 120 may be, for example, a wired or wireless network interface card, a network adapter, or any other hardware device suitable for transmission of packets, frames, or other data constructs. In the embodiment of FIG. 1, network interface 120 may transmit a shared virtual disk 140 to a particular client upon receipt of a request for access to shared virtual disk 140 from the client.

Storage area 130 may comprise a number of physical media for storing data under the direction of processor 110. For example, storage area 130 may include one or more hard disks, solid state drives, tape drives, nanodrives, holographic storage devices, or any combination of such storage devices. In some embodiments, storage area 130 may include a plurality of storage devices that, in combination, form a pool of available storage. Other suitable configurations for providing storage space in storage area 130 will be apparent to those of skill in the art.

As illustrated, storage area 130 may maintain client-specific data 135 for each of a plurality of clients. Client-specific data 135 may maintain a unique identifier for each client, such that the client may access the stored data using the identifier.

For example, client-specific data may index the data using a Media Access Control (MAC) address, a universally unique identifier (UUID), a unique computer name or ID, or any other value unique among the clients.

The client-specific data 135 may also include activation credentials for each client for use in activating application 142. These credentials may have been generated and saved, for example, during a previous activation of the application for the particular client. Application 142 may he any application that uses a reactivation process to confirm proper activation of the application. For example, application 142 may be an operating system, productivity suite, Portable Document Format (PDF) editor, or image editing or graphics package. Other applications that utilize a reactivation process will be apparent to those of skill in the art.

The activation credentials may vary depending on the particular application 142 included in the shared virtual disk 140. For example, when application 142 is a version of Microsoft Windows®, the activation credentials may include three files, NeoWinIO, pkeyconFIG.xrm-ms, and tokens.dat, each of which may store data used during the Windows activation process. In addition, the activation credentials may include a Windows product key, which may be, for example, a Multiple Activation Key (MAK), a Volume License Key (VLK), or a key for a single computer. In some embodiments, the product key used to activate application 142 may be encrypted and stored in one of the activation credential files (e.g., NeoWinIO) or, alternatively, may be contained in a configuration repository of the operating system. This configuration repository may be, for example, a registry, a set of configuration files, a configuration database, a set of Extensible Markup Language (XML) structures, and the like.

During retrieval and loading of the shared virtual disk 140 by a particular client, the client may retrieve the corresponding client-specific data 135 from storage area 130. In particular, as described in detail below, the particular client may activate the application 142 contained in the shared virtual disk 140 using the activation credentials contained in the client-specific data 135.

Shared virtual disk 140 may be a software image for transmission to a plurality of clients. Shared virtual disk 140 may be stored in storage area 130 or in another machine-readable storage medium accessible to server 100. In operation, each of a plurality of clients in communication with server 100 may retrieve an identical copy of shared virtual disk 140. Each client may then load and execute a copy of application 142 contained in the shared virtual disk 140. In this manner, each client may load and execute its own copy of application 142 without having to locally store and maintain the application.

In addition to the application 142, shared virtual disk 140 may contain an activation service that includes activation credential retrieving instructions 144 and activation credential reinstalling instructions 146. In particular, because each client may share the same virtual disk 140, the activation process of the application 142 may experience problems due to the different hardware configuration and/or identity of each client. For example, initiation of application 142 on a different machine may trigger a determination that the application is not properly activated for the given client. More specifically, application 142 may detect that the particular client has not properly activated the application 142 based on a differing value of a Media Access Control (MAC) address, universally unique identifier (UUID), or other identifier of the client. To address this issue, each client may execute the activation service upon loading the shared virtual disk 140.

More specifically, upon loading shared virtual disk 140, each client may first determine whether application 142 is properly activated using, for example, a function call to a service or other procedure used for managing activation of application 142. When the client determines that the application is not currently activated for the client, the client may first execute activation credential retrieving instructions 144 to obtain appropriate activation credentials from the client-specific data 135 maintained in storage area 130. The activation credentials may include, for example, a set of files or data specific to the client, which, in some embodiments, may have been saved during a prior activation of the application for the particular client. As detailed above, client-specific data 135 may be indexed using a unique identifier (e.g., MAC address, UUID, etc.), such that the particular client may access the client-specific data 135 using this identifier.

Upon receipt of these activation credentials from storage area 130 of server 100, the client may then execute activation credential reinstalling instructions 146 to verify activation of the application 142. Reinstalling instructions 146 may execute a reactivation process of application 142 by for example, calling an activation function or procedure provided for confirming activation of the application. As a specific example, when application 142 is an operating system, the client may call an operating system function used to confirm proper activation of operating system 142. As a more specific example, when the application 142 is a version of Windows®, reinstalling instructions 146 may call the Windows Management Instrumentation (WMI) function, InstallProductKey, using a product key extracted from the client-specific data or retrieved from shared virtual disk 140. After execution of reinstalling instructions 146, application 142 may be properly activated for the particular client, such that the client may run application 142 without encountering problems related to the activation procedure.

It should be noted that the description above refers to activation of an application as a whole. As used herein, however, references to activation of an application include activation of a feature or subset of features of a particular application. For example, the application may be activated to allow for a volume license (e.g., the application can be used on 25 clients). As another example, the application may include different sets of features depending on the level purchased by the user (e.g., a basic and professional version). Other suitable features and subsets of features for activation will be apparent to those of skill in the art.

Figure 2:
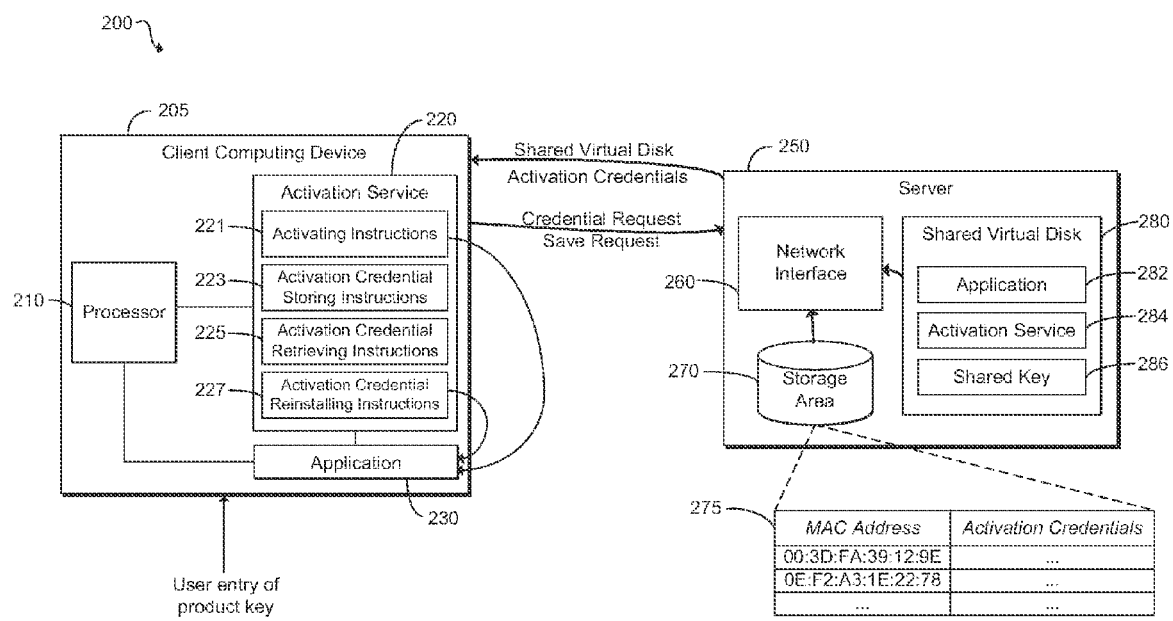
FIG. 2 is a block diagram of an example server in communication with an example client computing device to provide access to a shared virtual disk including an activation service.

FIG. 2 is a block diagram of an example server 250 in communication with an example client computing device 205 to provide access to a shared virtual disk 280 including an activation service 284. As illustrated, the client-server architecture 200 may include a client computing device 205 in communication with a server 250.

Client computing device 205 may be, for example, a desktop computer, a laptop computer, a thin client, a handheld computing device, a mobile phone, or the like. In the embodiment of FIG. 2, computing device 205 includes a processor 210, a copy of activation service 220, and a copy of operating system 230.

Processor 210 may be a central processing unit (CPU), a semiconductor-based microprocessor, or any other hardware device suitable for retrieval and execution of instructions stored in a machine-readable storage medium. In particular, processor 210 may fetch, decode, and execute activation service 220 and application 230 to implement the functionality described in detail below.

As illustrated, client computing device 205 may first receive a copy of shared virtual disk 280 from server 250. This may occur automatically upon boot-up of client computing device 205 or, alternatively, at the direction of a user of computing device 205. The shared virtual disk 280 may include application 282, activation service 284, and, in some embodiments, shared key 286. Upon receipt of shared virtual disk 280, client computing device 205 may begin execution of the included software, such that client computing device 205 locally executes activation service 220 and application 230, each of which may be in the form of executable instructions encoded on a machine-readable storage medium.

More specifically, client computing device 205 may execute the instructions 221, 223, 225, 227 included in activation service 220 to properly activate the application 230 for client computing device 205, in some embodiments, client computing device 205 may automatically execute activation service 220 upon boot-up of application 230 by client computing device 205. This may be accomplished by, for example, installing the activation service 220 in the operating system image on shared virtual disk 280, such that all versions of application 282 distributed to clients include the activation service 284 as an OS service that executes automatically.

Upon start-up of activation service 220, activating instructions 221 may be configured to launch or permit a launch of an application activation procedure. In particular, when client computing device 205 boots, client-specific data 275 of storage area 270 may lack client-specific data for the particular computing device. This may indicate to activation service 220 that the application 230 has not yet been activated for the particular client computing device 205. Accordingly, activating instructions 221 may trigger activation of the application 230 using a product key obtained from the user or from server 250. For example, activating instructions 221 may initiate a function call or other message to application 230 indicating that application 230 should launch an activation procedure.

To give a specific example, when application 230 is a version of Microsoft Windows®, each computer may he required to execute an activation utility that includes electronic or verbal communication with Microsoft. Computing device 205 may perform the activation via an Internet or modem connection or, alternatively, using data obtained by the user during a telephone call with an agent. Based on entry or transmission of a proper product key to Microsoft, the operating system may be properly activated for client computing device 205 for its particular hardware configuration. A similar process may occur for the first activation attempt for other applications, such as Microsoft Office® and Adobe Acrobat®.

The data used for the application activation process may vary depending on the particular implementation. In some embodiments, computing device 205 may use a shared activation key 286 stored on shared virtual disk 280. For example, a shared key activation key may be stored in the configuration repository of an operating system on the shared virtual disk (e.g., the registry) or in some other predefined location. As an alternative, computing device 205 may activate application 230 using a client-specific key. This client-specific key may be entered by a user into a window displayed during the activation procedure. Alternatively, in some embodiments, a client-specific key may be entered in advance into client-specific data 275 and may be accessed using an identifier of client computing device 205 (e.g., a MAC address, UUID, computer name, etc.). In this manner, the client-specific key may be obtained for each client without a requirement for user interaction.

Regardless of the particular activation key used, application 230 may be activated based on provision of this key to the manufacturer, developer, or publisher of the application. In response to proper activation of application 230 using an activation key, application 230 may generate a set of activation credentials used to verify activation during subsequent boots of the shared virtual disk. For example, these activation credentials may contain the product key and information used to identify the particular client for which the product key is valid. As described above, when the application 230 is a version of Windows®, the activation credentials may include three files, NeoWinIO, pkeyconFIG.xrm-ms, and tokens.dat, each of which may store data used to confirm activation of a particular machine.

In a typical shared disk environment, this client-specific data would be lost, as client computing device 205 retrieves an exact copy of shared virtual disk 280 upon each boot-up. Accordingly, to allow the activation credentials to be reinstalled at a subsequent time to confirm proper activation of the application 230, activation credential storing instructions 223 of activation service 220 may store the generated activation credentials in a client-specific location in storage area 270 of server 250. As illustrated in client-specific data 275, this data may be saved in association with, for example, a MAC address of each client. Other suitable identifiers used to store the data include a UUID and a computer name.

Activation credential retrieving instructions 225 may be configured to retrieve the stored activation credentials during subsequent boots of client computing device 205. In particular, when client computing device 205 determines that the application 230 is not currently activated upon a next boot-up (or that activation needs to be verified), client computing device 205 may execute activation credential retrieving instructions 225 to obtain the stored activation credentials from the client-specific data 275 maintained in storage area 270. As detailed above, the activation credentials may include, for example, a out of files or data specific to the client, which, in some embodiments, may have been saved during a previous boot a the particular client. As also detailed above, client-specific data 275 may be indexed using a unique identifier (e.g., MAC address, UUID, etc.), such that the particular client may access the client-specific data 275 using this identifier.

Upon receipt of the client-specific data 275, client computing device 205 may execute activation credential reinstalling instructions 227 to verify activation of application 230. As an example, client computing device 205 may call a function used to confirm proper activation of application 230. In some embodiments, reinstalling instructions 227 may locally execute the reinstallation function without contacting a remote activation server. As an example of an activation process, when application 230 is a version of Windows®, reinstalling instructions 227 may call the Windows Management Instrumentation (WMI) function, InstallProductKey, using a product key associated with client computing device 205.

In some embodiments, activation credential reinstalling instructions 227 may include instructions for determining whether the activation credentials retrieved from the client-specific data 275 include a product key. This product key may be, for example, a client-specific key entered by a user during the activation process. If such a key is located in the client-specific data 275, reinstalling instructions 227 may then call a function used to reinstall the activation data using the product key.

Instructions 227 may also include instructions for retrieving the product key from shared virtual disk 280 when it is determined that the client-specific data does not include a product key. For example, instructions 227 may retrieve a shared product key from the configuration repository of the installed operating system or another predetermined location in shared virtual disk 280. Upon retrieving this product key, reinstalling instructions 227 may then call the function used to reinstall the activation data using the retrieved product key. Activation of application 230 may then be verified using both the product key and the activation credentials retrieved from client-specific data 275.

Upon execution of the reinstall function, reinstalling instructions 227 may execute instructions to determine whether activation of the application 230 was successfully verified. If not, reinstalling instructions 227 may trigger an activation method for application 230 to ensure that the application is properly activated for client computing device 205. As an example, reinstalling functions 227 may trigger execution of activating instructions 221, described in detail above.

As with server 100 of FIG. 1, server 250 may be, for example, an enterprise server of a local area network, a thin client server, a cloud computing server, or the like. In the embodiment of FIG. 2, server 250 includes network interface 260, storage area 270, and shared virtual disk 280. Server 250 may also include a processor (not shown) and other hardware components that will be apparent to those of skill in the art.

Network interface 260 may be configured similarly to network interface 120 of FIG. 1. Thus, network interface 260 may be a hardware device that manages the transmission and receipt of data to and from a plurality of clients. As illustrated, network interface 260 may send shared virtual disk 280 and client-specific activation credentials 275 to client computing device 205. Conversely, network interface 260 may receive requests from client computing device 205 to save activation credentials and, subsequently, to retrieve the saved credentials.

Storage area 270 may be configured similarly to storage area 130 of FIG. 1. Thus, storage area 270 may comprise a number of physical media for storing data. As illustrated, storage area 270 may maintain client-specific data 275 for each of a plurality of clients. In the embodiment of FIG. 2, client-specific data 275 stores activation credentials for a number of clients, including the clients identified by the listed MAC addresses. It should be noted that other identifiers (e.g., UUIDs, computer names, etc,) may be used to index the client-specific data 275.

Finally, server 250 may include shared virtual disk 280, which may be configured similarly to shared virtual disk 140 of FIG. 1. Thus, shared virtual disk 280 may be a software image for transmission to a plurality of clients. Shared virtual disk 280 may include an application 282, activation service 284, and, in some embodiments, a shared key 286, each of which are described in further detail above.

Figure 3:
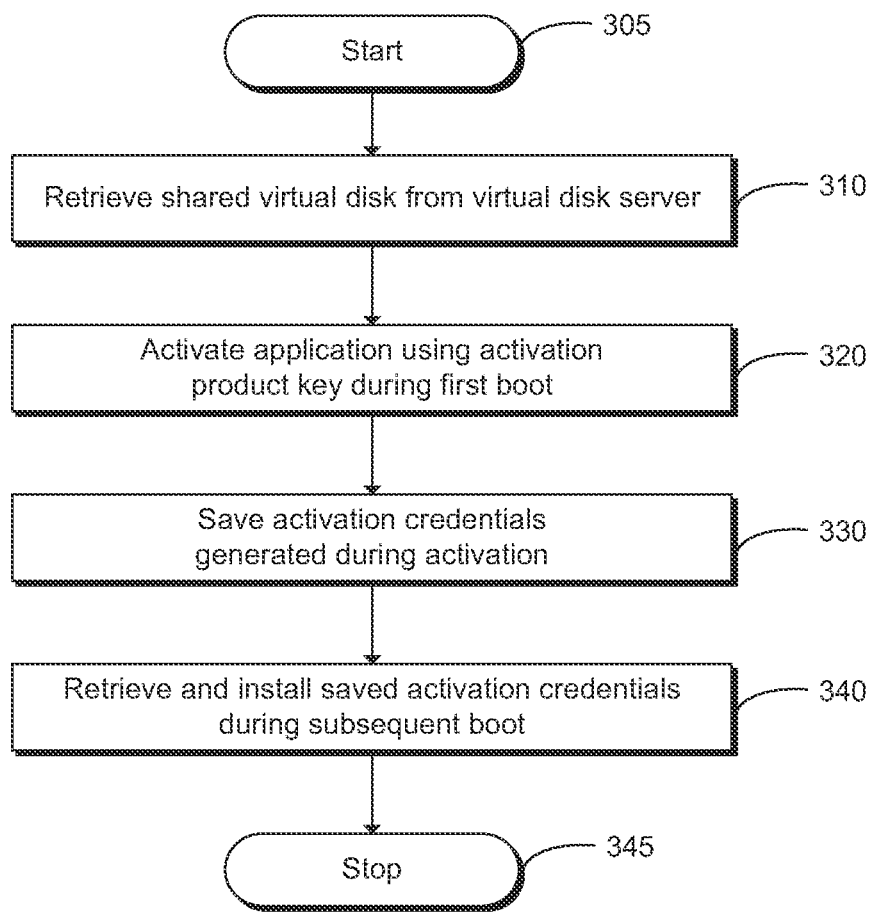
FIG. 3 is a flowchart of an example method for activating an application included on a shared virtual disk.

FIG. 3 is a flowchart of an example method 300 for activating an application included on a shared virtual disk. Although execution of method 300 is described below with reference to client computing device 205 and server 250, other suitable components for execution of method 300 will be apparent to those of skill in the art. Method 300 may be implemented in the form of executable instructions stored on a machine-readable storage medium.

Method 300 may start in block 305 and proceed to block 310, where client computing device 205 may retrieve a shared virtual disk from a virtual disk server 250. This shared virtual disk may include one or more applications (e.g., an operating system, productivity suite, image editing software, etc.), such that computing device 205 launches and executes a copy of the applications from the shared virtual disk.

Method 300 may then proceed to block 320, where computing device 205 may activate a particular application on the shared virtual disk during a first boot of the operating system.

For example, computing device 205 may launch an application activation process and provide a product key to the activation process. This product key may be, for example, a shared product key stored on the virtual disk (e.g., a key stored in the configuration repository of the operating system) or a client-specific key entered by the user or retrieved from a client-specific location on server 250. Regardless of the type of key, computing device 205 may launch the activation process using the retrieved key. In response to successful authentication, the application may generate activation credentials for future use in verifying activation.

It should be noted that, as used herein, the term "first boot" does not refer only to the first ever time the operating system is booted by a particular client or to the boot procedure itself Rather, the "first boot" refers to any situation in which execution of the application activation process is needed while a particular client is up and running (i.e., prior to shutdown). For example, some applications may require a periodic reactivation, such that the full activation process must be executed multiple times. In such a case, the "first boot" may refer to any boot in which full activation is required.

After successful authentication in block 320, method 300 may proceed to block 330, where computing device 205 may save the generated activation credentials on server 250. In particular, in some embodiments, computing device 205 may transmit the activation credentials to server 250 with an instruction to store the credentials in a client-specific location on server 250. In response to receipt of this request, server 250 may save the activation credentials, such that the credentials may later be retrieved using a unique identifier of client computing device 205.

Method 300 may then proceed to block 340, where a subsequent boot of client computing device 205 may occur. During this boot, client computing device 205 may again retrieve the application from the virtual disk server 250 and load the application for execution. During or prior to loading of the application, client computing device 205 may retrieve the activation credentials from the client-specific location on server 250.

Upon receipt of the credentials, client computing device 205 may then reinstall the credentials, thereby verifying activation of the application. For example, client computing device 205 may retrieve the credentials and extract a product key, which may be encrypted or unencrypted. Client computing device 205 may then call a product key reinstall method or similar method provided by the operating system or by the application itself using the retrieved product key as a parameter for the method. The reinstall method may then verify activation of the application for the particular client using the product key and the retrieved activation credentials. After activation of the application is confirmed, client computing device 205 may then proceed to load and execute the application. Finally, method 300 may proceed to block 345, where method 300 may stop.

Figure 4A:
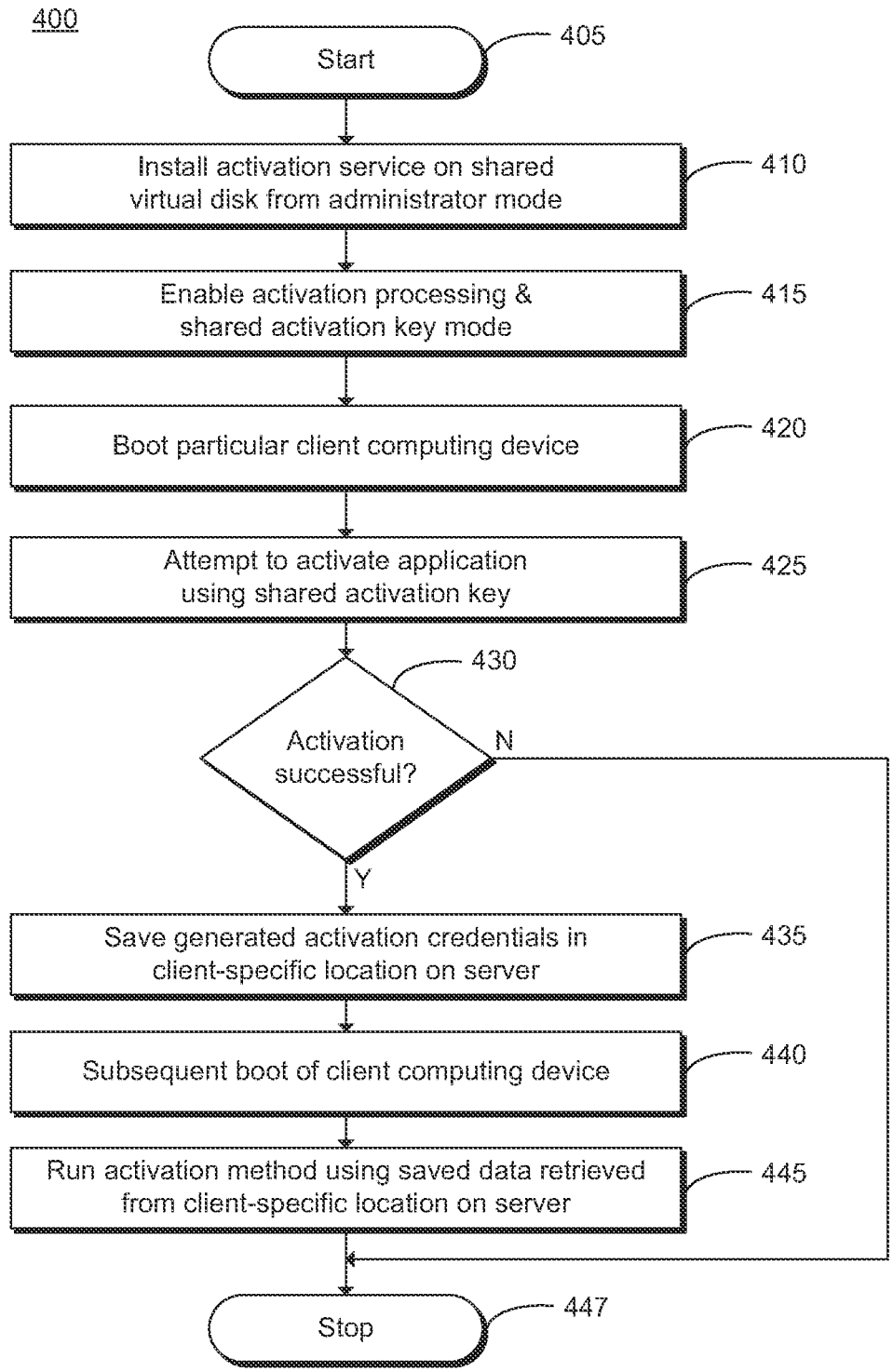
FIG. 4A is a flowchart of an example method for activating an application included on a shared virtual disk using a shared activation key.

FIG. 4A is a flowchart of an example method 400 for activating an application included on a shared virtual disk using a shared activation key. Although execution of method 400 is described below with reference to client computing device 205 and server 250, other suitable components for execution of method 400 will be apparent to those of skill in the art. Method 400 may be implemented in the form of executable instructions stored on a machine-readable storage medium.

Method 400 may start in block 405 and proceed to block 410, where an application activation service may he installed on the shared virtual disk maintained on server 250. For example, a network administrator may launch the operating system included on the shared virtual disk from an administrator mode, such that the image of the operating system may be modified. The network administrator may then install the activation service, such that the copy of the operating system distributed to the client computing devices includes the application activation service.

After installation of the activation service, method 400 may proceed to block 415, where the network administrator may configure options of the activation service. In particular, the network administrator may enable activation processing and, in some embodiments, may configure the activation service to automatically launch upon start-up of the operating system. In addition, the network administrator may enable shared product key mode, such that the activation service uses a shared key when attempting to activate a particular application. In some embodiments, the network administrator may enter this activation key when enabling the shared key mode.

After the activation service is properly installed and configured, method 400 may proceed to block 420, where a particular client computing device 205 may obtain the operating system image and load the operating system. Method 400 may then proceed to block 425, where the client 205 may attempt to activate a particular application using the shared product key. This application may be the operating system itself or, alternatively, an application that may be executed within the operating system. As an example, the activation service may check a predetermined location in the shared virtual disk for presence of the shared activation key. This predetermined location may be, for example, a specific location in the configuration repository of the operating system or a specific file location in the disk image. As another example, the activation service may contact server 250 with a request for the shared activation key.

Regardless of the method used to obtain the key, after obtaining the shared key, client computing device 205 may launch an activation procedure to activate the application using the shared key. Method 400 may then proceed to block 430, where client 205 may determine whether the activation procedure was successful. If the procedure failed, method 400 may proceed to block 447, where method 400 may stop. When the application is the operating system, the operating system may continue to load and execute, even upon failed activation. However, in such instances, the operating system may display messages to the user requesting activation and, should such activation fail to occur, the operating system may log out the user. Alternatively, when the application is a software program other than the operating system, the application may fail to load unless the user immediately provides proper activation data In some embodiments, an activation attempt may again be triggered after a predetermined period of time.

Alternatively, when it is determined in block 430 that the activation was successful, method 400 may proceed to block 435. In block 435, client computing device 205 may transmit the activation credentials generated by the activated application to server 250, along with a request to save the activation credentials in a client-specific location on server 250. In response to receipt of such a request, server 250 may store the activation credentials in a location that may subsequently be accessed using a unique identifier for the client computing device 205.

Method 400 may then proceed to block 440, where a subsequent boot of client computing device 205 may occur. In particular, client computing device 205 may again retrieve the disk image from server 250 and initiate loading of the operating system. Method 400 may then proceed to block 445, where, during loading of the operating system, client computing device 205 may retrieve the activation credentials from the client-specific location on server 250. Alternatively, client computing device 205 may retrieve the credentials when a user launches the particular application for which activation is to be confirmed. Upon receipt of the credentials, client computing device 205 may then reinstall the credentials, thereby verifying activation of the application. Client computing device 205 may then continue to load and execute the operating system and/or application. After proper activation of the application is confirmed, method 400 may proceed to block 447, where method 400 may stop.

It should be noted that, in some embodiments, the application may include a requirement that it be re-activated periodically (e.g., once every six months, once a year, etc.), in such instances, the attempt to confirm activation with the client-specific data in block 445 may be unsuccessful. In this case, blocks 420, 425, 430, and 435 may again be executed, such that the application is re-activated for the client, new activation credentials are generated, and the new activation credentials are stored in the client-specific location on the server for future use in verifying activation.

Figure 4B:
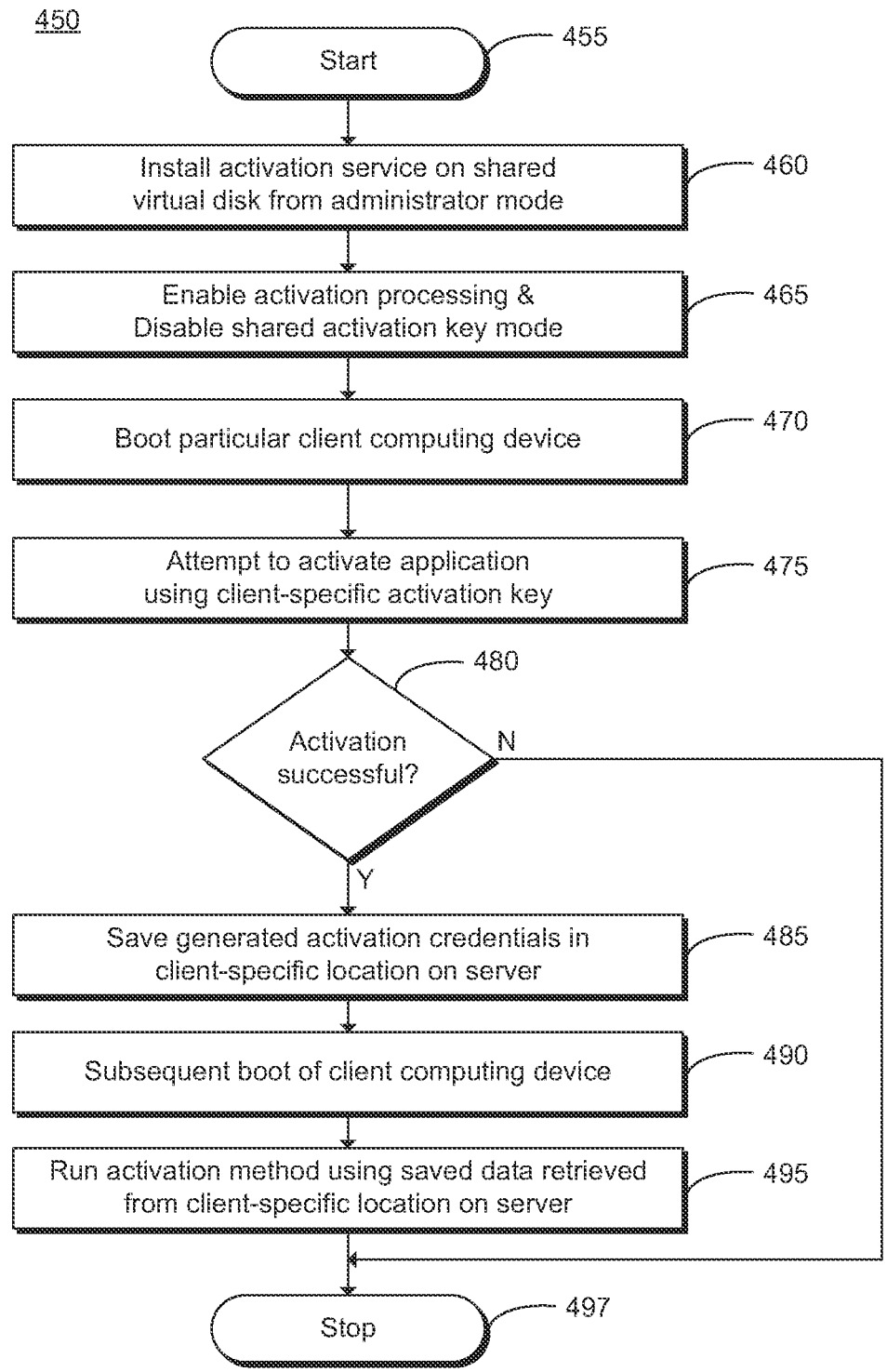
FIG. 4B is a flowchart of an example method for activating an application included on a shared virtual disk using a client-specific activation key.

FIG. 4B is a flowchart of an example method 450 for activating an application included on a shared virtual disk using a client-specific activation key. Although execution of method 450 is described below with reference to client computing device 205 and server 250, other suitable components for execution of method 450 will be apparent to those of skill in the art. Method 450 may be implemented in the form of executable instructions stored on a machine-readable storage medium.

Method 450 may start in block 455 and proceed to block 460, where an application activation service may be installed on the shared virtual disk included on server 250. As with block 410 of method 400, a network administrator may install the activation service from an administrator mode, such that the copy of the operating system distributed to the client computing devices includes the activation service.

After installation of the activation service, method 450 may proceed to block 465, where the network administrator may configure options of the activation service. in particular, the network administrator may enable activation processing and, in some embodiments, may configure the activation service to automatically launch upon start-up of the operating system. In addition, the network administrator may disable shared product key mode. In this manner, client computing device 205 may use a client-specific activation key in activating the application. Client computing device 205 may therefore attempt to retrieve the activation key from a client-specific location in server 250 or, as an alternative, may request user entry of the client-specific key. In embodiments in which the client 205 will retrieve the key from server 250, the network administrator may manually enter each client's key into a corresponding client-specific location on server 250.

After the activation service is properly installed and configured, method 450 may proceed to block 470, where a particular client computing device 205 may obtain the operating system image and attempt to load the operating system. Method 450 may then proceed to block 475, where client 205 may attempt to activate a particular application using the client-specific activation key. As described above, client 205 may attempt to retrieve the key from server 250 or may request user entry of the key.

Upon receipt of the client-specific activation key, client computing device 205 may launch an application activation procedure using the key. Method 450 may then proceed to block 480, where client 205 may determine whether the activation procedure was successful. If the procedure failed, method 450 may proceed to block 497, where method 450 may stop. In some embodiments, an activation attempt may again be triggered after a predetermined period of time.

Alternatively, when it is determined in block 480 that the activation was successful, method 450 may proceed to block 485. As with block 435 of method 400, client computing device 205 may transmit the activation credentials generated by the application to server 250, along with a request to save the activation credentials in a client-specific location on server 250. In response, server 250 may store the activation credentials in the client-specific location.

Method 450 may then proceed to block 490, where a subsequent boot of client computing device 205 may occur and, in response, the client 205 may attempt to load the operating system. Method 450 may then proceed to block 495, where, during loading of the operating system or at the time the application is launched, client computing device 205 may retrieve the activation credentials from the client-specific location on server 250. Upon receipt of the credentials, client computing device 205 may then reinstall the credentials, thereby verifying activation of the application. Client computing device 205 may then continue to load and execute the application. After proper activation of the application is confirmed, method 450 may proceed to block 497, where method 450 may stop.

It should be noted that, as with method 400, the application may include a requirement that it be re-activated periodically (e.g., once every six months, once a year, etc.) In such instances, the attempt to confirm activation with the client-specific data in block 495 may be unsuccessful. In this case, blocks 470, 475, 480, and 485 may again be executed, such that the application is re-activated for the client, new activation credentials are generated, and the new activation credentials are stored in the client-specific location on the server for future use in verifying activation.

Figure 5A:
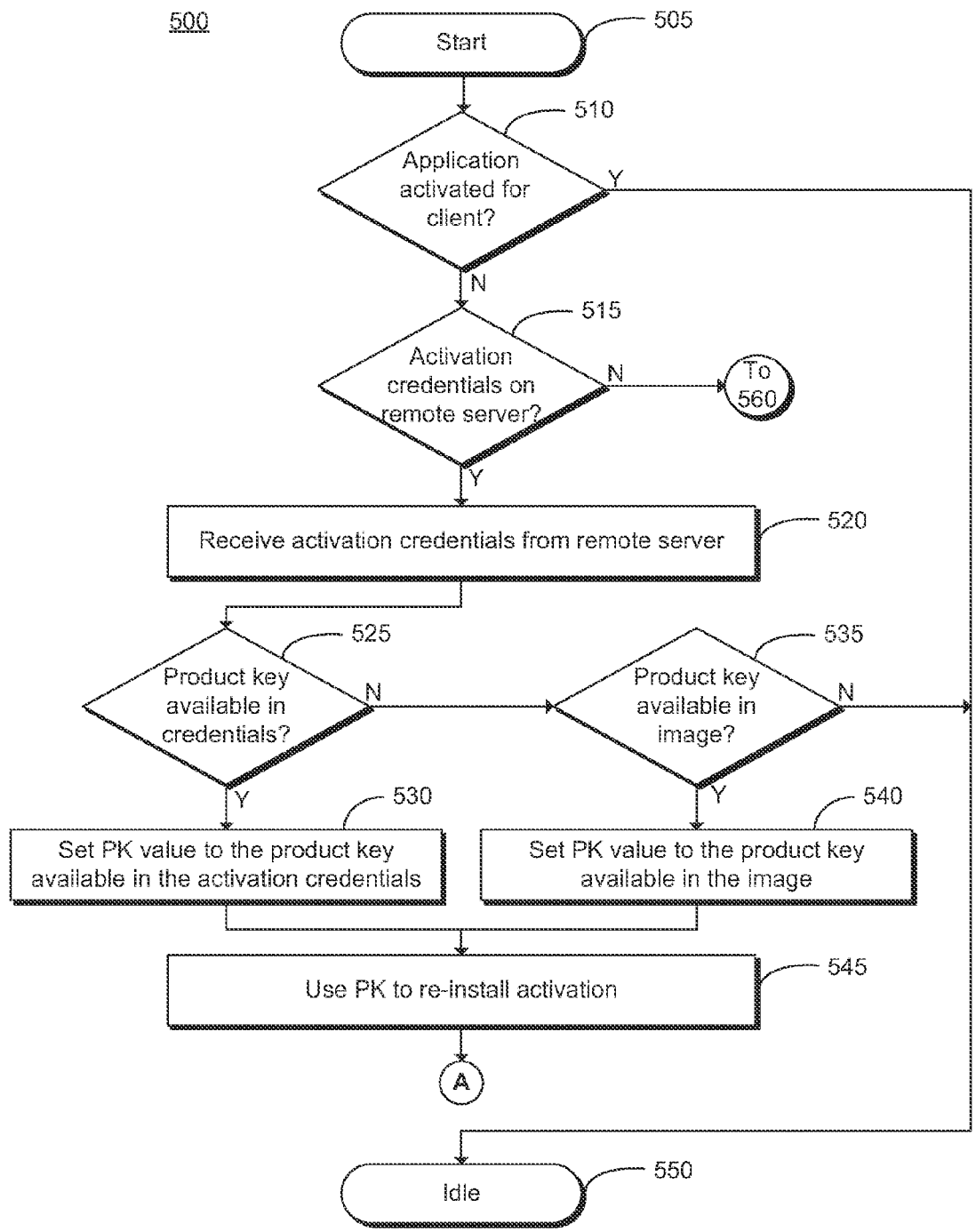
FIGS. 5A and 5B are flowcharts of an example method performed upon start-up of an activation service configured to activate an application included on a shared virtual disk.
Figure 5B:
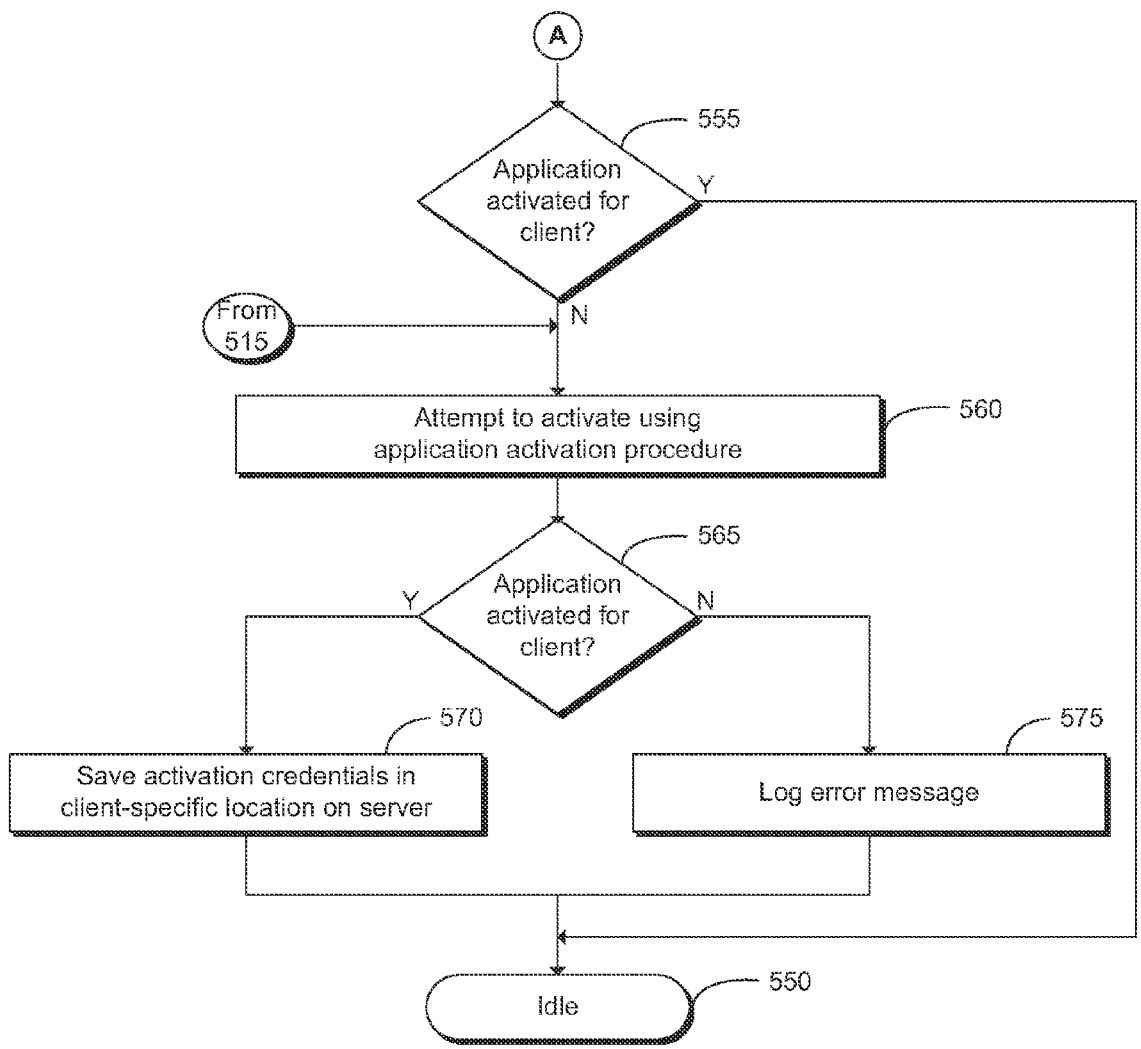

FIGS. 5A and 5B are flowcharts of an example method 500 performed upon start-up of an activation service configured to activate an application included on a shared virtual disk. Although execution of method 500 is described below with reference to client computing device 205 and server 250, other suitable components for execution of method 500 will be apparent to those of skill in the art. Method 500 may be implemented in the form of executable instructions stored on a machine-readable storage medium.

Method 500 may start in block 505 and proceed to block 510, where the activation process may be initiated by a client computing device 205 that has retrieved and loaded the virtual disk image, in particular, in block 510, client computing device 205 may determine whether a particular application is currently activated for the client. When it is determined that the application is activated, method 500 may proceed to block 550, where the activation service may enter an idle state.

Alternatively, when client computing device 205 determines that the application is not currently activated for the client (i.e., that the application has never been activated or that verification of activation is required), method 500 may proceed to block 515, where client computing device 205 may determine whether client-specific activation credentials are available in the client-specific data on server 250. For example, client computing device 205 may send a request to server 250 to obtain client-specific activation data. When such data does not exist on server 250, computing device 205 may determine that it has not yet activated the application, Accordingly, method 500 may proceed to block 560 of FIG. 5B for activation, as described in further detail below in connection with FIG. 5B.

Alternatively, when computing device 205 determines in block 515 that the activation credentials are present on server 250, computing device 205 may determine that the application has already been activated, but that verification of activation is required. Method 500 may therefore proceed to block 520, where client computing device 205 may receive the activation credentials from server 250. As detailed above, the activation credentials may include one or more files or other data generated during a previous activation of the application for client computing device 205.

Method 500 may then proceed to block 525, where client computing device 205 may determine whether a product key is available in the activation credentials. For example, client computing device 205 may examine the credentials and attempt to extract a product key. If such a product key is present in the activation credentials, method 500 may proceed to block 530, where client computing device 205 may set the product key value to be used in reinstalling the activation credentials to the key retrieved from the credentials. Method 500 may then proceed to block 545, described in detail below.

Alternatively, when client computing device 205 is unable to extract a product key from the credentials in block 525, method 500 may proceed to block 535. In block 535, client computing device 205 may determine whether a product key is available in the virtual disk image. For example, the virtual disk image may include a shared activation key for use by multiple clients in the configuration repository of the operating system or another predetermined location on the disk, if such a product key is present, method 500 may proceed to block 540, where client computing device 205 may set the key to be used to the shared activation key. Method 500 may then proceed to block 545, described in detail below. Alternatively, when a product key is also not present in the image, client computing device 205 may determine that verifying activation of the application is not feasible and the activation service may therefore enter an idle state in block 550.

Referring now to block 545, computing device 205 may use the product key to reinstall the activation credentials. As an example, computing device 205 may call a function used to verity proper activation of the application using the product key value that was set in either block 530 or block 540. The function may then use the product key and the activation credentials received in block 520 to attempt to verify proper activation. In embodiments in which the application is a version of Windows®, computing device 205 may call the WMI function, InstallProductKey, providing the product key as input. After completion of the activation attempt, method 500 may proceed to block 555 of FIG. 5B.

Referring now to FIG. 5B, in block 555, client computing device 205 may determine whether the activation attempt in block 545 was successful. If so, the application may now be fully functional and method 500 may proceed to block 550, where the activation service may enter an idle state. Alternatively, when it is determined that the client is not activated after the reinstall attempt, method 500 may proceed to block 560, where the activation service may attempt to activate the application.

In block 560, client computing device 205 may attempt to activate the operating system using an application activation process. As described above, method 500 may reach block 560 when there are no client-specific activation credentials present on the server (e.g., when the client is loading the application for the first time) or, alternatively when reactivation of the application is required (e.g., when the application requires a periodic reactivation). More specifically, in block 560, client computing device 205 may launch an application activation process and provide a product key to the activation process. This product key may be, for example, a shared product key available to the client on the virtual disk or a client-specific key entered by the user or retrieved from a client-specific location on server 250.

After execution of the application activation procedure, method 500 may proceed to block 565, where client computing device 205 may determine whether the application is properly activated for the client. If so, method 500 may proceed to block 570, where client computing device 205 may save the generated activation credentials in a client-specific location on server 250. Alternatively, when the application is not properly activated, method 500 may proceed to block 575, where the client computing device 205 may log an error message indicating that the application was not successfully activated. After execution of either block 570 or block 575, method 500 may proceed to block 550, where the activation service may enter an idle state.

Figure 5C:
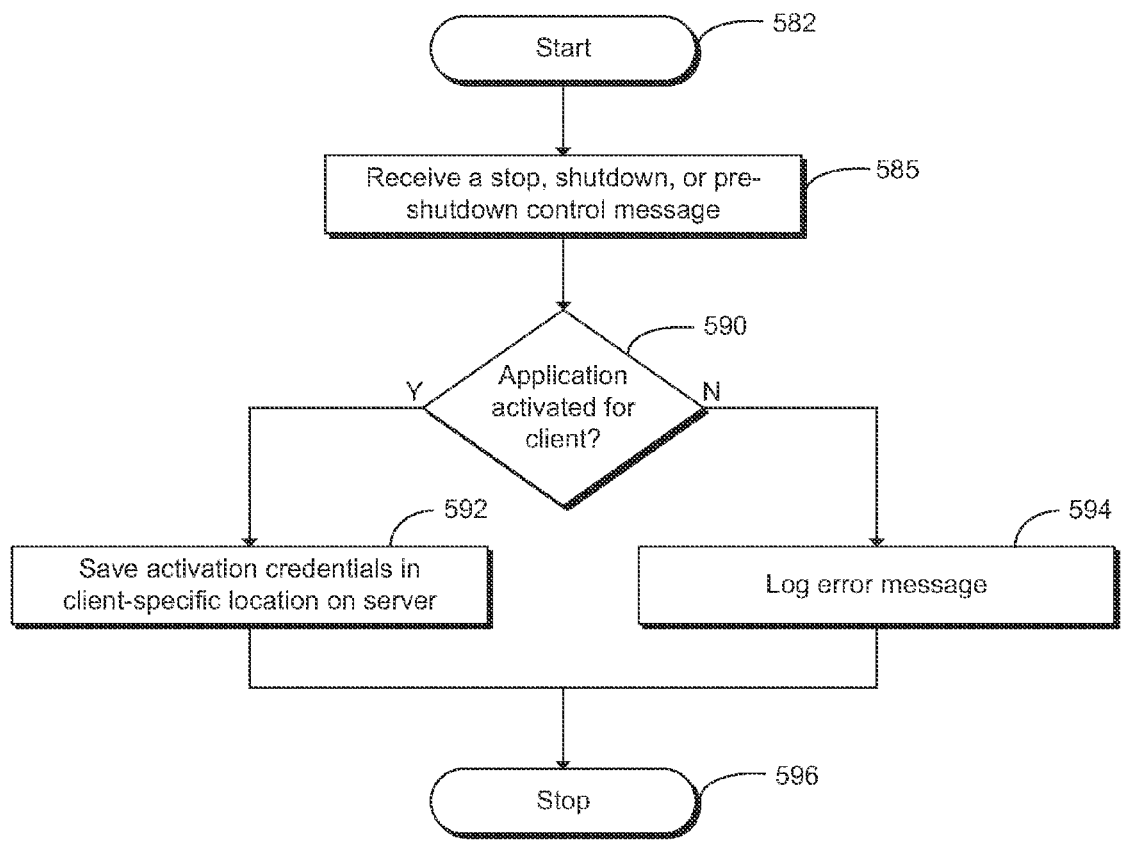
FIG. 5C is a flowchart of an example method performed upon shutdown of the activation service.

FIG. 5C is a flowchart of an example method 580 performed upon shutdown of the activation service. Although execution of method 580 is described below with reference to client computing device 205 and server 250, other suitable components for execution of method 580 will be apparent to those of skill in the art. Method 580 may be implemented in the form of executable instructions stored on a machine-readable storage medium.

Method 580 may start in block 582 and proceed to block 585, where the activation service executing on client computing device 205 may receive a stop, shutdown, or pre-shutdown control message. Such a message may be provided, for example, when the user of client computing device 205 issues a command to shutdown or reset the client.

Upon receipt of such a message, method 580 may proceed to block 590, where client computing device 205 may determine whether the application is properly activated for the client. If so, method 580 may proceed to block 592, where client computing device 205 may save the current activation credentials in a client-specific location on server 250. Saving the credentials at shutdown is useful, for example, when the user has manually activated the application without the knowledge of the activation service. Upon shutdown, client computing device 205 may check the activation status of the application and, when the application is currently activated, save the corresponding activation credentials on server 250. In this manner, the activation credentials maintained on server 250 may be current upon the next boot-up.

Alternatively, when the application is not properly activated, method 580 may proceed to block 594, where the client computing device 205 may log an error message indicating that the client was not successfully activated. After execution of either block 592 or block 594, method 580 may proceed to block 596, where the activation service may stop execution.

Figure 6:
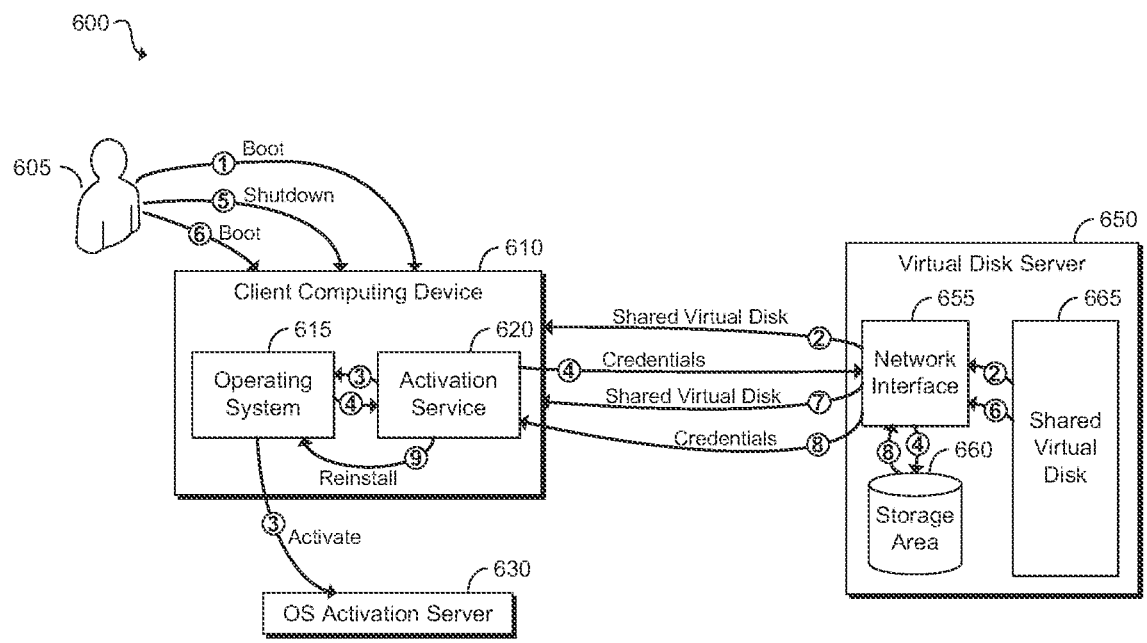
FIG. 6 is a block diagram of an example operation flow for activating an operating system included on a shared virtual disk accessed by a client computing device.

FIG. 6 is a block diagram of an example operation flow 600 for activating an operating system 615 included on a shared virtual disk 665 accessed by a client computing device 610. As illustrated, a client computing device 610 operated by a particular user 605 includes an operating system 615 and an activation service 620, which may be included in a shared virtual disk 665 retrieved from server 650. Server 650 may include a network interface 655, a storage area 660 that includes client-specific data, and a shared virtual disk 665. Although described below with respect to activation of an operating system, operation flow 600 may be adapted to any application for which an activation process is required.

As illustrated, in block 1 of operation flow 600, a user 605 may boot the client computing device 610 by, for example, pressing a power button of the device. In response, client computing device 610 may request a shared virtual disk and therefore send a request message to server 650.

In block 2 of operation flow 600, server 650 may respond to the request from client 610 with a copy of the shared virtual disk. Upon receipt of the image, client computing device 610 may launch operating system 615 and, as part of the boot-up procedure of operating system 615, may also launch activation service 620.

In block 3 of operation flow 600, assuming that the operating system has not been activated for client 610, activation service 620 may launch an operating system activation procedure by, for example, issuing a function call to operating system 615. In response, operating system 615 may carry out an activation procedure using a product key, which may be stored on the received virtual disk image, entered by user 605, or obtained from a client-specific location in storage area 660 of server 650. This activation procedure may involve communication with an operating system activation server 630, which may be a server provided by the manufacturer of the operating system to manage the activation process. Upon proper activation, operating system 615 may generate a set of activation credentials.

In block 4, activation service 620 may receive the generated activation credentials from operating system 615 and forward them to server 650 for storage. In response to receipt of the credentials, network interface 655 may provide the credentials to storage area 660. Storage area 660 may then store the received credentials in a client-specific storage location and may index the credentials using an identifier of client computing device 610. This identifier may be, for example, a MAC address, a UUID, a computer name, and the like.

In block 5, user 605 may issue a shutdown command to client computing device 610. Accordingly, activation service 620 may stop and operating system 615 may execute a shutdown procedure. In block 6, at a subsequent point in time, user 605 may again boot client computing device 610. Accordingly, in block 7, as part of its boot-up procedure, client computing device 610 may receive a copy of the shared virtual disk 665 from server 650. Upon receipt of the image, client computing device 610 may initiate operating system 615 and activation service 620.

In block 8, activation service 620 may, upon initialization, request and receive client-specific activation credentials from a client-specific location in storage area 660 using an identifier of the client (e.g., a MAC address, UUID, computer name, etc.). As described above in connection with block 4, these activation credentials may have been stored during a prior activation of operating system 615.

Finally, in block 9, in response to receipt of the client-specific activation credentials, activation service 620 may confirm activation of operating system 615. In particular, activation service 620 may execute a reinstall function using a product key extracted from the client-specific activation credentials or retrieved from the operating system image. In response to receipt of a proper product key, operating system 615 may confirm that it is properly activated. Accordingly, client computing device 610 may be operational, without the need for user 605 to intervene in the activation process.

According to the foregoing, example embodiments ensure that an application included on a shared virtual disk is activated for each client computing device. In particular, each client may verify activation of the application using client-specific activation data maintained on the virtual disk server. In this manner, the application may be properly activated for each client, resolving issues caused by the application activation process in typical shared disk environments.

I claim:

1. A server comprising:
a network interface that transmits a shared virtual disk to each of a plurality of clients; and
a storage area that maintains client-specific data for each of the plurality of clients,
wherein the shared virtual disk comprises an application and instructions executable by each respective client of the plurality of clients, the instructions comprising:
instructions for retrieving, from the client-specific data for the respective client, activation credentials generated in response to successful activation of the application during a previous boot, and
instructions for reinstalling the activation credentials to verify activation of the application for the respective client, comprising:
instructions retrieving a product key from the activation credentials, and
instructions for calling a product key reinstall method of the application using the retrieved product key as a parameter.

2. The server of claim 1, wherein:
the instructions included in the shared virtual disk are part of a service installed on the shared virtual disk, the service automatically executing upon boot-up of an operating system included on the shared virtual disk by the respective client.

3. The server of claim 1, wherein:
the client-specific data identifies the respective client using a unique identifier, and
the instructions for retrieving the activation credentials obtain the credentials by accessing the client-specific data using the unique identifier of the respective client.

4. The server of claim 1, wherein the instructions for reinstalling the activation credentials for the respective client comprise:
instructions for calling a function used to reinstall the activation data using the product key included in the activation credentials retrieved from the client-specific data.

5. The server of claim 1, wherein the instructions for reinstalling the activation credentials for the respective client further comprise:
instructions for calling a function used to reinstall the activation data using the product key retrieved from the shared virtual disk.

6. The server of claim 1, wherein the instructions included in the shared virtual disk further comprise:
instructions for determining whether the instructions for reinstalling the activation credentials successfully verified activation of the application, and
instructions for triggering an activation method for the application when it is determined that the instructions for reinstalling did not successfully verify activation.

7. The server of claim 6 wherein the instructions included in the shared virtual disk further comprise:
instructions for storing the activation credentials generated by the activation method in the client-specific data when the activation method successfully activated the application.

8. A method for activating an application included on a shared virtual disk accessed by a client computing device, the method comprising:
retrieving, by the client computing device, an image of the shared virtual disk from a virtual disk server, the image including the application;
activating the application for the client computing device using an activation product key during a first boot of the operating system;
saving activation credentials generated in response to successful activation of the application on a client-specific location on the virtual disk server; and
retrieving and installing the saved activation credentials for the application during a subsequent boot by the client computing device, comprising:
retrieving a product key from the saved activation credentials in the client-specific location on the virtual disk server, and
calling a product key reinstall method of the application using the retrieved product key as a parameter.

9. The method of claim 8, wherein activating the application for the client computing device comprises one of:
retrieving the activation product key from a configuration repository of an operating system stored in the shared virtual disk,
receiving user entry of the activation product key, and
retrieving the activation product key from the virtual disk server.

10. The method of claim 8, further comprising:
determining whether the application is activated at shutdown of the client computing device; and
when it is determined that the application is activated at shutdown, updating the saved activation credentials in the client-specific location on the virtual disk sever with current activation credentials.

* * * * *

UNITED STATES PATENT AND TRADEMARK OFFICE
CERTIFICATE OF CORRECTION

PATENT NO. : 8,874,891 B2  
APPLICATION NO. : 13/639501  
DATED : October 28, 2014  
INVENTOR(S) : Yves Gattegno Page 1 of 1

It is certified that error appears in the above-identified patent and that said Letters Patent is hereby corrected as shown below:

In the Claims

In column 16, line 7, in Claim 7, delete "6" and insert -- 6, --, therefor.

In column 16, line 45, in Claim 10, delete "sever" and insert -- server --, therefor.

Signed and Sealed this  
Tenth Day of March, 2015

Michelle K. Lee  
*Deputy Director of the United States Patent and Trademark Office*